United States Patent [19]
Grego

[11] Patent Number: 5,089,698
[45] Date of Patent: Feb. 18, 1992

[54] INTERFEROMETRIC OPTICAL SYSTEM FOR MEASURING LINEAR OR ANGULAR DISPLACEMENTS BY BEAT SIGNALS

[75] Inventor: Giorgio Grego, Venaria, Italy

[73] Assignee: Cselt-Centro Studi e Laboratori Telecomunicazioni S.p.A., Turin, Italy

[21] Appl. No.: 537,476

[22] Filed: Jun. 13, 1990

[30] Foreign Application Priority Data

Jun. 27, 1989 [IT] Italy .................. 67516 A/89

[51] Int. Cl.$^5$ .................. G01D 5/34; G01B 9/02
[52] U.S. Cl. .................. 250/231.13; 356/349; 356/375
[58] Field of Search .......... 356/349, 358, 346, 345, 356/363, 356, 373, 375, 5; 250/231.13, 234, 235, 231.1

[56] References Cited
U.S. PATENT DOCUMENTS

| | | | |
|---|---|---|---|
| 4,395,123 | 7/1983 | Minott | 356/363 |
| 4,410,268 | 10/1983 | Tamaki | 356/124 |
| 4,710,026 | 12/1987 | Magome et al. | 356/349 |
| 4,848,908 | 7/1989 | Huang | 356/349 |

FOREIGN PATENT DOCUMENTS 144188 11/1988 U.S.S.R. .................. 356/349

Primary Examiner—David C. Nelms
Assistant Examiner—Michael Messinger
Attorney, Agent, or Firm—Herbert Dubno

[57] ABSTRACT

The system uses a monochromatic radiation source (1) and an acousto-optic modulator (2), which acts as a Bragg modulator and is driven by a frequency which is caused to periodically vary. The modulator emits a first beam having the same wavelength as the source and a second beam, whose wavelength and emission direction vary with the modulating frequency and which is collimated. For measuring angular displacements, the collimated beam is recombined with the first beam after traversing a plate (5) with parallel and plane faces integral for the rotation with a moving device, and a photodetector (12) generates a beat signal whose frequency depends on the angular position of the plate (5). For measuring linear displacements, the two beams are directly sent onto a detector (12) integral with the moving device.

12 Claims, 4 Drawing Sheets

INTERFEROMETRIC OPTICAL SYSTEM FOR MEASURING LINEAR OR ANGULAR DISPLACEMENTS BY BEAT SIGNALS

FIELD OF THE INVENTION

The present invention relates to a system for measuring the displacement of moving object and, more particularly, to a system based on optical interferometry for measuring linear and angular displacements.

BACKGROUND OF THE INVENTION

Accurate measurements of the displacements of moving devices are often required. However, the desired precision is often difficult to obtain, chiefly when very limited angular displacements are to be measured.

At present, the so-called optical encoders are the most accurate angle measuring systems. They generally consist of a glass disk, whose surface has suitably arranged opaque and transparent sectors and which is integral with a rotating shaft, the angular position of which is to be determined.

The disk is interposed between a light source and a photodetector which, according to whether the encoder is an incremental or an absolute encoder, supplies either a train of pulses, whose number is proportional to the increment of the angle by which the shaft is rotated, or a bit configuration coding the shaft position.

These systems allow angles of the order of the seconds of degree to be measured, yet they have mechanical sensitivity and precision limits due, on the one hand, to the impossibility of reducing beyond a certain limit the sizes of the opaque and transparent sectors and of the detector sensing surface and, on the other hand, to the need far limiting the encoder disk size. Moreover, the precision decreases as the angle to be measured decreases.

OBJECTS OF THE INVENTION

An object is to provide an improved system which will allow even very small angles to be measured with a high precision which is basically independent of the width of an angle to be measured.

Another object is to provide a system which can be used for measuring both linear and angular displacements.

SUMMARY OF THE INVENTION

According to the invention, a system for measuring the displacements of a moving device comprises:

- a source of a monochromatic light beam at a first wavelength;
- an acousto-optic modulator, operated as a Bragg modulator, to obtain from the light beam emitted by the source a first beam, having the same wavelength as the beam emitted by the source, and a second beam, comprising radiations at at least a second wavelength different from the first, for sending the two beams along two different paths;
- means for recombining the two beams at the end of said paths;
- means for generating an electrical signal representative of the beat signals between the recombined beams, and
- menas for processing the beat signals.

According to the invention
the acousto-optic modulator is driven by an electrical signal whose frequency is caused to periodically vary, so that the second beam is a varying frequency beam and is emitted at an angle varying as the modulator driving frequency varies;

an optical collimation system is placed between the modulator and the recombining means, in the path of the second beam, to transform the second beam into a collimated beam, which propagates in a constant direction whatever the emission angle;

the means for generating the beat signals generate a signal whose frequency is variable and depends, at a given instant, on the present position of the moving device with respect to a reference position; and the means for processing the beat signals measure the frequency of the beat signals in the present position of the moving device, and compare it with a frequency of the same signal measured in the reference position of the moving device, and compute the displacement from the difference between the two frequency values.

When linear displacements are to be measured, the moving device is integral with the beat signal generating means and the optical collimation system sends the collimated beam into a direction which is not parallel with the displacement direction of the moving device.

For measuring angular displacements, a transparent plate with parallel and plane faces is placed between the collimating optical system and the beat signal generating means. This plate is integral for the rotation with the moving device and is placed perpendicular to the optical system axis when the moving device is in the reference position.

BRIEF DESCRIPTION OF THE DRAWING

The invention will be better understood with reference to the annexed drawing in which.

SPECIFIC DESCRIPTION

Figure 1:
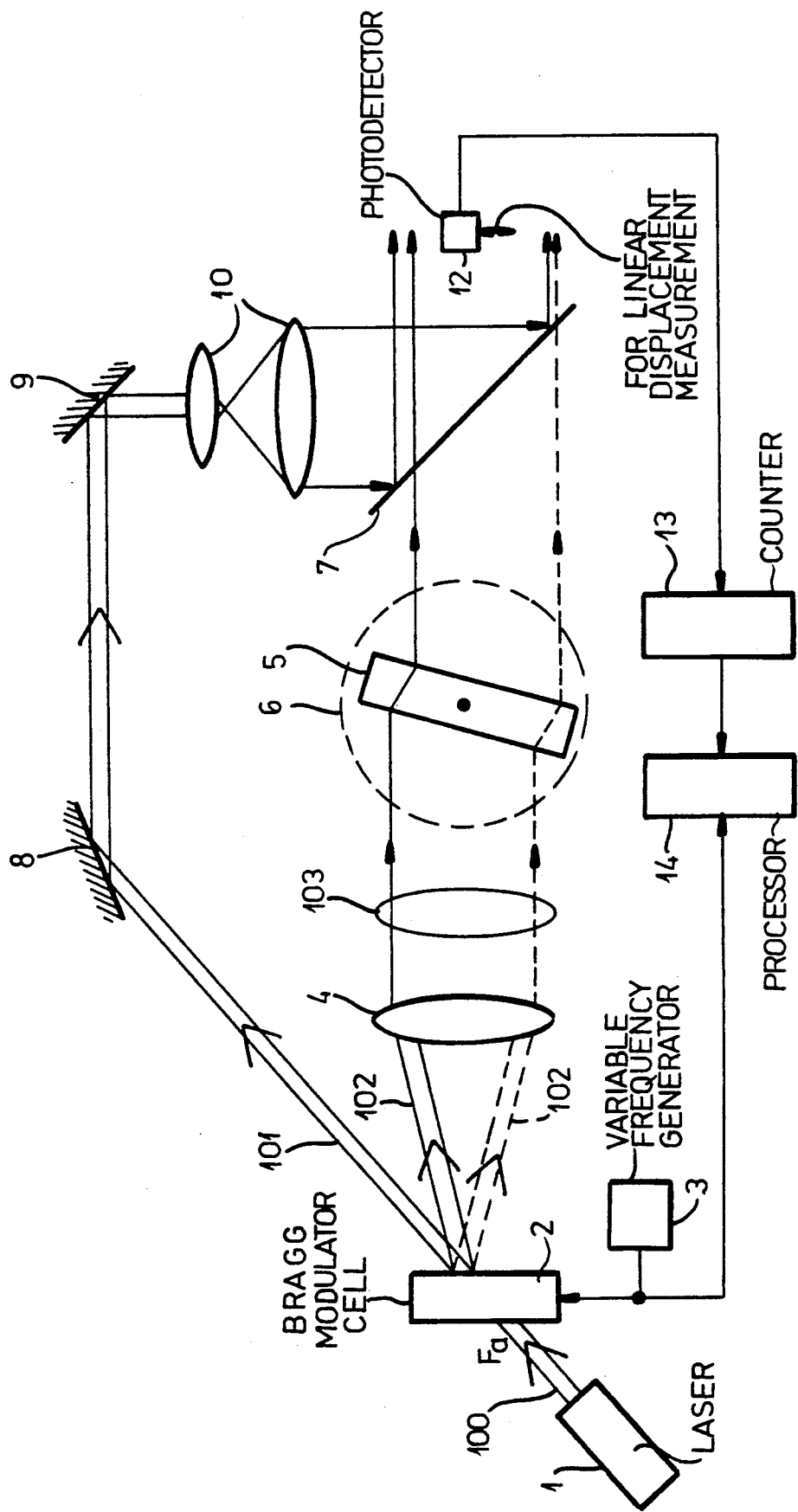
FIG. 1 is a schematic representation of the apparatus provided by the invention.

As shown in the drawing, light beam 100 outgoing from a substantially monochromatic source, more particularly a laser 1 operating at a frequency f0, is sent to an acousto-optic cell 2 which is driven by an electrical signal with variable frequency and is operated as a Bragg type modulator. In other words, light beam 100 arrives at cell 2 with an incidence angle equal to Bragg angle $\theta_B$, which, as known, depends on a wavelength $\lambda$ of the optical signal and $\Lambda$ of the acoustic signal induced by the electrical signal according to relation $\sin \theta_B = \lambda/2\Lambda$.

Driving an acousto-optic cell with a variable radiofrequency is well known in the art and cells driven by a signal whose frequency varies from some MHz to about one GHz are commercially available. Preferably, the electrical signal is obtained by modulating the radiofrequency signal generated by an oscillator with a periodic ramp signal, whose frequency is lower than that of the oscillator signal (e.g. of the order of kHz). Reference numeral 3 in the drawing denotes the generator of the variable frequency f driving cell 2. By way of example, this frequency can vary around a central value f1 and be comprised between two extreme values $f1-f2$, $f1+f2$.

Under the above conditions, the acousto-optic cell emits a non-deflected beam 101, at the same frequency f0 as the beam emitted by laser 1, and a deflected beam 102 which forms with beam 101 an angle twice the Bragg angle and whose frequency differs from value f0 by an amount equal to the modulating frequency f. By way of example, it will be supposed that beam 102 has a frequency f+f0. Since the modulating frequency is variable, both the emission angle and the frequency of deflected beam 102 will vary at each instant. More and particularly, denoting by $\theta_{B1}$, $\theta_{B2}$ (FIG. 2) the Bragg angles corresponding to central frequency f1 and to one of the extreme frequencies of the modulation range (e.g. minimum frequency f1−f2), the deflected beam will move through an angle $2\phi$, where $\phi=2(\theta_{B1}-\theta_{B2})$, during a period of the ramp signal. A different frequency value will correspond to each position within this angle $2\phi$.

Deflected beam 102 is collimated by an optical system 4 which is placed at focal distance from the output face of cell 2 and has a size allowing it to encompass the whole angle $2\phi$. Radiations with frequency f0+f1 (corresponding to the central frequency of the modulation range) will propagate along the axis of optical system 4 and, if D is the focal length of optical system 4, the positions assumed by the two extreme frequencies will be spaced apart by a distance 2Y, where $$Y = D.\tan\phi = D.\tan 2(\theta_{B1}-\theta_{B2}) \quad (1)$$

In other words, for each unit variation of the modulating signal frequency, collimated beam 103 will undergo a displacement, perpendicular to the axis of optical system 4, given by $$y = D.[\tan 2(\theta_{B1}-\theta_{B2})]/f2 \quad (2)$$

Figure 2:
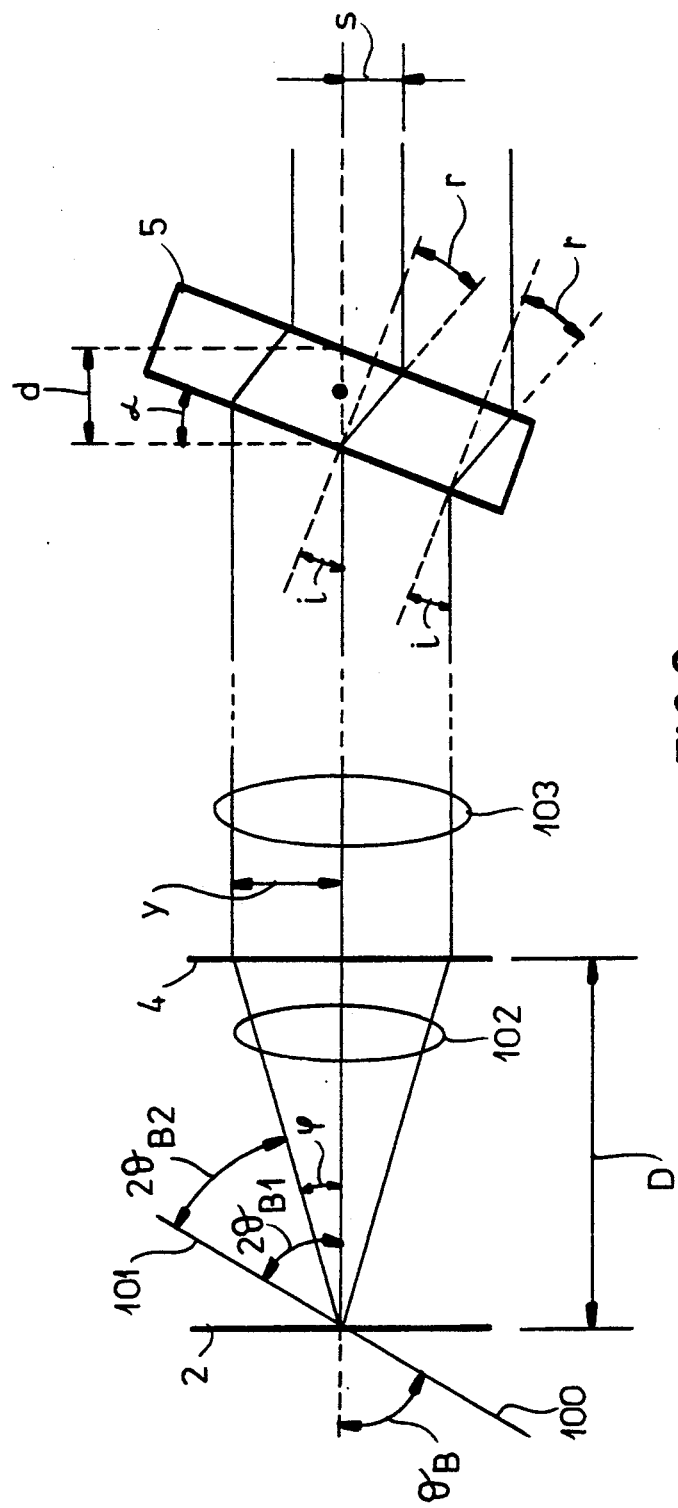
FIG. 2 shows in a simplified way and on enlarged scale a part of the apparatus of FIG. 1.

The drawing shows the trajectories corresponding to the two extreme frequencies and to the central frequency of beam 103 at the output of optical system 4 (FIG. 2). Angle widths are enhanced to make the drawing clearer.

A transparent plate 5 with plane and parallel faces is located along the trajectory of collimated beam 103 and is mounted on a rotating support (schematically shown by dotted line circle 6 in FIG. 1), allowing the plate to rotate about an axis parallel to the main faces of the plate. More particularly this axis is an axis perpendicular to the drawing plane and passing through the plate center. Advantageously, the plate center lies on the axis of optical system 4. Depending on the applications of the invention, support 6 can be e.g. integral with the support of a prism whose solid angle or minimum deviation angle are to be measured or with the support of a spectrometer prism, or with the positioning devices of an antenna, etc. Hence the plate rotation angle will represent the angle to be measured.

The various frequencies in the collimated beam 103 arrive on plate 5 at different instants and at different plate points and, according to incidence angle i on the plate (equal to angle of the plate with the vertical direction), will undergo a shift s (possibly equal to 0) given by relation:

$$s = d\frac{\sin(i-r)}{\cos r} \quad (3)$$

where r is the refraction angle and d is the plate thickness. Relation (3) is immediately deduced by applying the usual trigonometric formulae.

A semi-transparent mirror 7 (FIG. 1), acting as a beam recombiner, is in the path of the beam outgoing from the plate, is traversed by this beam and also receives, on the reflecting face, beam 101 at frequency f0 outgoing from acousto-optic cell 2. This beam is sent towards the reflecting face by mirrors 8, 9 and its cross-sectional size is made to correspond with the size of semi-transparent mirror 7 by a beam expander 10.

A part of the recombined beam is collected by a photodetector 12, which generates an electrical beat signal. Owing to the finite size of the detector surface, a certain range of the frequencies composing the beam tranversing plate 5 will take part in the beat generation. Since the different frequencies in beam 103 are emitted at different instants, the beat signal will have a variable frequency and an average frequency will be measured. Taking into account that the various frequencies arrive at plate 5 at different points and undergo a shift dependent on plate orientation with respect to the optical system axis, the average beat frequency will depend on the relative positions of the photodetector and the beam, and hence on the angular plate position.

Advantageously photodetector 12 is substantially aligned with the axis of optical system 4, so as to allow measurement of angular displacements in either direction. By this arrangement, in a reference condition in which the plate is orthogonal to optical system 4, the photodetector axis is aligned with the propagation path of frequency f0+f1 and the average beat frequency will be f1.

Photodetector 12 is connected to a measurement device 13, e.g. a counter, determining the average beat frequency within a measurement interval of suitable duration (e.g. 1 s) as an average number of pulses generated by the photodetector; measurement device 13 is followed by a processor 14, which obtains the displacement value, and consequently supplies incidence angle value, from the frequency difference with respect to a reference condition in which the plate is orthogonal to the collimated beam of optical system 4.

The operation of the described device is the following. First the apparatus is calibrated. To this aim, the pairs of values i, s relevant to the particular plate used are stored in processor 14. This operation can be carried out by the computing unit of the processor itself by applying relation (3). Thereafter, it is necessary to determine a reference position of plate 5, e.g. a position orthogonal to the beam collimated by optical system 4. To this end the frequency of the output signal of photodetector 12 is measured first in the absence of the plate and then with the plate arranged orthogonal to the beam. Under both conditions there is no shifting of the beam traversing the plate, and hence, under the hypotheses made (photodetector axis aligned with the axis of optical system 4 and modulation frequency of cell 2 varying symmetrically around a central value f1), the beat supplied by detector 12 should have in both cases an average frequency f1. Clearly, if such a frequency is not obtained when the plate is present, the plate position is to be adjusted until the desired value is obtained. Now the device is calibrated and ready for use.

By way of example the device provided by the invention can be associated with an optical bench for characterizing a prism starting from the knowledge of the minimum deviation angle. This requires determination of the angular position assumed by a viewing telescope with respect to a reference position, where the prism is removed from the support and the telescope directly collects the measurement light beam. Support 6 of plate 5, for such a measurement, will be then integral with the support of telescope.

In the position corresponding to the minimum deviation of the prism, determined in a well known way, the plate will be at a certain angle with the reference position, and said angle is equal, as said, to an incidence angle i of the collimated beam 103 on plate 5. As a consequence the beam emerging from the plate will be shifted by $s(\alpha)$ with respect to the incident beam, so that a frequency $f0+f(\alpha)$ will propagate in correspondence with the axis of the optical system in place of frequency $f0+f1$. The average frequency of the beat signal supplied by detector 12 will then be $f()$ instead of $f1$. Taking into account relation (2), from the frequency difference $\Delta f = f(\alpha) - f1$ the processor computes shift $$s(\alpha) = \Delta f \cdot [\tan 2(\theta_{B1} - \theta_{B2})]/f2$$

and obtains the desired value i from value $s(\alpha)$. The sign of the frequency difference, and hence of shift $s(\alpha)$, indicates the clockwise or counter-clockwise rotation of the moving device.

To evaluate the performance of the invention, reference is made to the following exemplary embodiment. Acousto-optic cell 2 is a commercial cell modulated by a 150 ±50 MHz frequency, so that $f2 = 50$ MHz; focal distance D of optical system 4 is chosen so that shift Y of the beam corresponding to the variation of the modulation frequency by 50 MHz is 5 mm; as a consequence $y = 0.1$ mm/MHz; plate 5 is a plate of LiNbO3 (n = 2.28) with thickness d = 10 mm. Initialization gives for i and s the values listed in the following table:

| i (°) | s (mm) |
| --- | --- |
| 0 | 0 |
| 0.001 | 0.000095 |
| 0.002 | 0.00019 |
| 0.003 | 0.000286 |
| 0.004 | 0.000381 |
| 0.005 | 0.000476 |
| ... | ... |
| 1 | 0.097988 |
| 2 | 0.196002 |
| 3 | 0.29407 |
| 4 | 0.392218 |
| 5 | 0.490471 |
| ... | ... |
| 42 | 4.409876 |
| 43 | 4.527376 |
| 44 | 4.645537 |
| 45 | 4.764347 |
| ... | ... |

Taking into account the value of y, it can be seen that for measuring angles of the order of 1°, it is necessary to measure a frequency variation of the order of 1 MHz in a signal whose maximum frequency attains 200 MHz; to measure angles of the order of the seconds (i.e. of the thousandths of a degree) it will be necessary to measure a frequency variation of about 1 kHz and so on. The apparatus sensitivity and precision depend therefore on the type of device used to measure the beat frequency. By way of example, highly accurate and not particularly expensive commercially available counters can measure frequencies of the order of some hundred MHz with a precision as good as one hundred Hz (and hence 10 times higher than that required for measuring the seconds of a degree). Under the hypothesis of using one of these counters as device 13, the system can measure angles whose amplitude is a fraction of one second (about 1/10000 of a degree).

Figure 3:
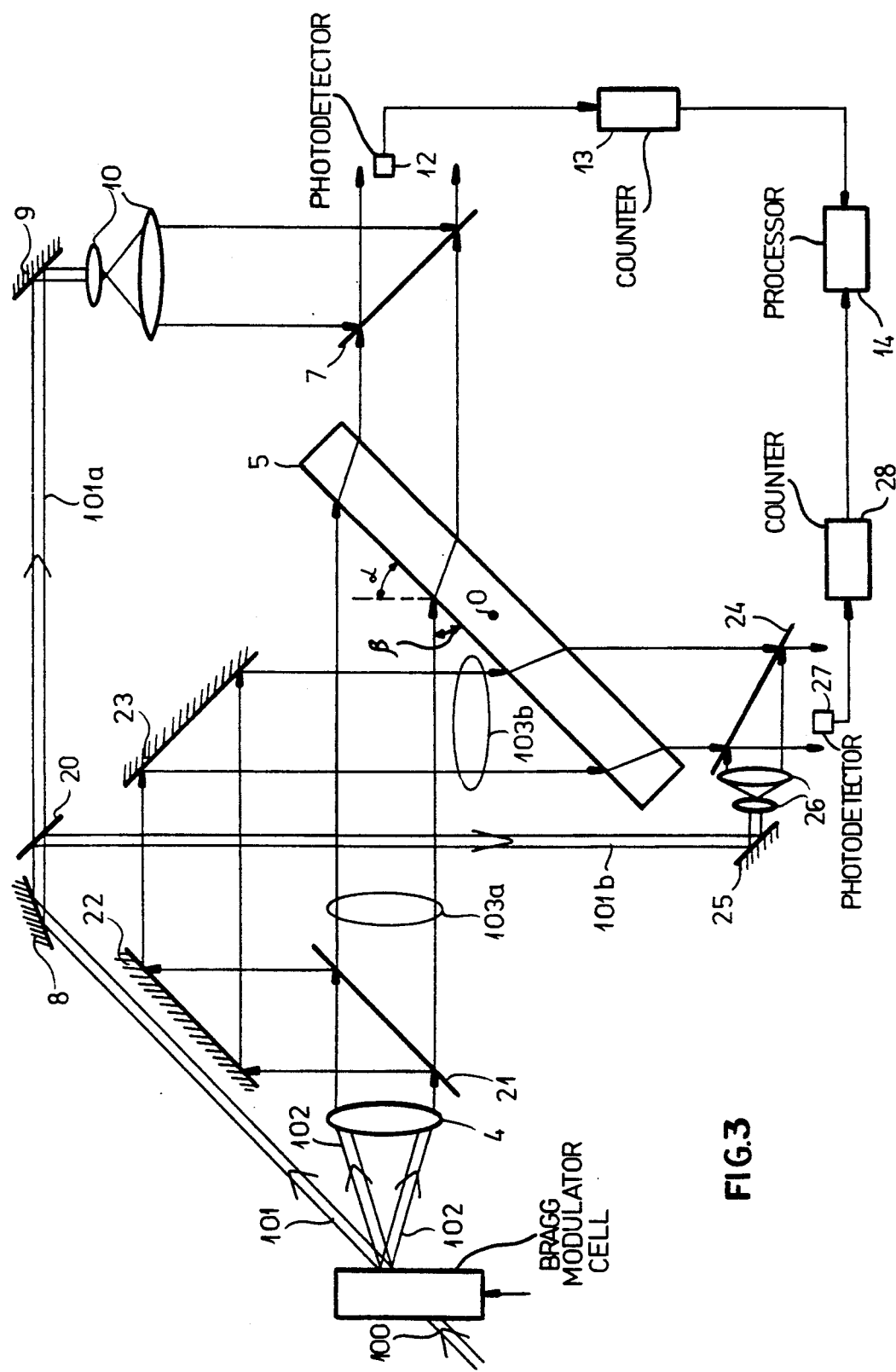
FIG. 3 shows a variant of the device of FIG. 1.

The arrangement described, where the rotation axis of plate 5 traverses optical system 4, is convenient for measuring angles substantially in the range between ±45°. To measure any rotation within 360°, the device can be modified as shown in FIG. 3, where for sake of simplicity neither source 1 nor oscillator 3 have been shown. The elements present also in FIG. 1 are denoted by the same reference numerals.

In that embodiment, the axis of plate 5 is shifted with respect to the axis of optical system 4 and on the trajectory of beams 101, 103 there are respective beam splitters 20, 21 splitting the beams received into two parts 101a, 101b and 103a, 103b. One part of each of the two beams (e.g. the transmitted parts 101a, 103a) is sent towards mirror 7, as in the diagram of FIG. 1, and originates a first beat signal at detector 12.

The second part 103b of the collimated beam is sent, through mirrors 22, 23, towards a zone of plate 5 different from the one receiving the first part, and arrives at a second beam recombiner 24, receiving also the second part 101b of beam 101, sent towards such a recombiner by a mirror 25 and a beam expander 26. On the trajectory of recombined beam 24 there is a second detector 27 connected to a respective counter 28 which determines the beat frequency generated by detector 27 and is also connected to processor 14.

The operating principle of the variant described in this Figure is basically identical to that of the embodiment of FIG. 1. Yet, two reference plate positions (e.g. orthogonal to each other, with the arrangement shown in the Figure) where the frequency of the beats supplied by both detectors is f1, are to be determined.

It is also to be noted that in case of rotation angles close to 0° or 90° plate 5 will intercept only one of the two parts of the collimated beam and hence only one of the two detectors 12, 27 supplies a useful signal; if on the contrary both parts of the collimated beam are intercepted by plate 5, it is possible to establish a priori what signal is to be used: e.g., the signal supplied by detector 12 can be used for rotations up to 45° (at which angle the beat signals supplied by both detectors have the same frequency), whilst the signal supplied by detector 27 can be used for wider angles. In the latter case, the actual plate rotation angle will be $90° \pm \beta$, where $\beta$ is the incidence angle determined by using the beat generated by detector 27.

It is clear that what described has been given only by way of nonlimiting example and that variations and modifications are possible without departing from the scope of the invention. More particularly the device of FIG. 1, without plate 5 or with the plate fixedly mounted perpendicular to the collimated beam, can be used to measure linear displacements of a moving device integral with photodetector 12 and displacing it transverse to the optical system axis. In this case, the collimated beam is not shifted and the beat frequency variation is due to detector displacement.

Figure 4:
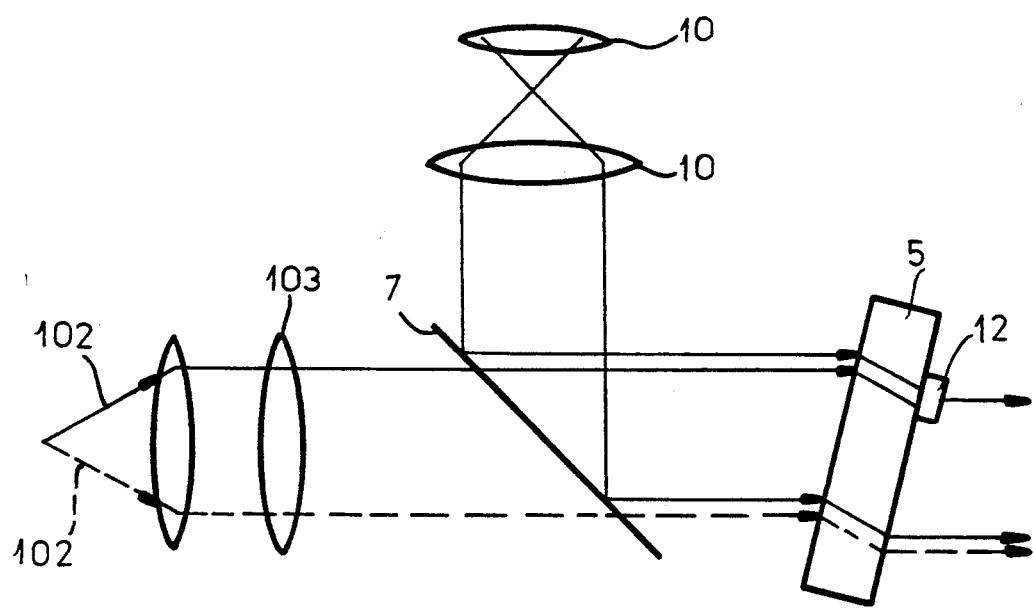
FIGS. 4 and 5 are partial views of further variants.
Figure 5:
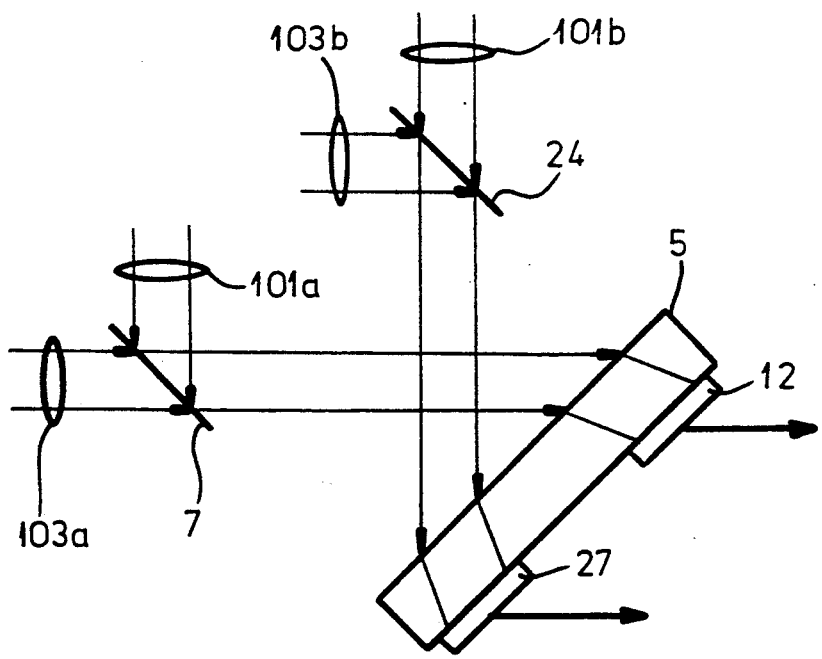

Moreover, in case of angular displacement measurements, to avoid errors caused by an imperfect parallelism of the faces of plate 5, detectors 12 and/or 27 can be arranged integral with the rear plate face, as shown in FIGS. 4 and 5. A hollow plate housing the detectors could also be used. Of course, in that case, recombination of the two beams must take place upstream of plate 5. The operation of the device is as already described, the only difference being that plate 5 shifts the recombined beam instead of the collimated beam. In case of angular displacement measurements, it is also possible to drive modulator 2 by a fixed frequency and to analyze phase variations of the beat due to optical path variations caused by the plate rotation.

I claim:

1. A system for measuring a displacement of a moving device, comprising:
   a source of a monochromatic light beam at a first wavelength;
   an acousto-optic Bragg modulator receiving said monochromatic light beam and emitting a first beam of said first wavelength and a second light beam propagated along respective paths;
   means for driving said acousto-optic modulator with an electric signal causing a frequency of said second beam to vary and to be emitted at an angle varying with variation of a driving frequency of said modulator;
   an optical collimator in said path of said second beam for transforming said second beam into a collimated beam propagated in a constant direction regardless of said angle;
   beam-recombining means for recombining said first and second beams at ends of said paths to generate a beat in a recombination of said first and second beams;
   signal-generating means for generating an electrical beat signal representative of said beat in said recombination of said first and second beams and having a variable frequency coupled to displacement of a moving device and dependent, at any instant, upon a present position of the moving device with respect to a reference position; and
   processor means connected with said signal-generating means for processing said beat signal and measuring a frequency thereof in a present position of said moving device, for comparing a measured frequency of the beat signal in said present position with a beat signal corresponding to a reference position of the moving device, and for computing a displacement of said moving device from a difference of compared frequencies of said beat signals.

2. A system as claimed in claim 1 wherein the moving device is operatively connected with said signal-generating means and causes translation thereof transverse to the axis of the collimation optical system.

3. A system as claimed in claim 1 wherein a plate with plane and parallel faces and predetermined refractive index and thickness is located between said optical collimator and the beam-recombining means, said plate being operatively connected to the moving device and being arranged perpendicular to a propagation direction of the collimated beam when the moving device is in said reference position.

4. A system as claimed in claim 1 wherein a plate with plane and parallel faces and predetermined refractive index and thickness is located downstream of the beam-recombining means, said plate operatively connected to the moving device and being arranged perpendicular to a propagation direction of the recombination of said first and second beams when the moving device is in said reference position, said signal-generating means comprising at least a first photodetector integral with rear face of said plate.

5. A system as claimed in claim 1 a hollow plate with plane parallel faces and predetermined refractive index and thickness is located downstream of the beam-recombining means, said plate being operatively connected for rotation to the moving device and being arranged perpendicular to a propagation direction of the recombination of said first and second beams when the moving device is in said reference position, said signal-generating means comprising at least a first photodetector arranged within the plate.

6. A system as claimed in claim 5 wherein said signal-generating means includes a first photodetector aligned with the axis of the optical collimator.

7. A system as claimed in claim 3 wherein in the path of the first beam and of the collimated beam there are disposed respective beam splitters which split the respective beams into two parts and send said parts towards respective first and second recombining means associated with first and second beat signal generating means followed by first and second signal processing means, the first and the second part of the collimated beam being sent towards a plate along different directions, and impinging on different zones of the surface plate, said plate being operatively connected to said device.

8. A system as claimed in claim 3 wherein in the path of the first beam and of the collimated beam there are disposed respective beam splitters which split the beams they intercept into two parts and send said parts towards respective first and second recombining means associated with first and second beat signal generating means followed by first and second signal processing means, the recombining means generating respective beams which are sent towards a plate along different directions and impinge on different zones of the surface of the plate, said plate being operatively connected to of the device, that first and second beat signal generating means are provided and comprise a first and second photodetector each arranged on the trajectory of a respective beam coming from the recombining means.

9. A system as claimed in claim 8 when the first and second photodetector are integral with an output face of the plate.

10. A system as claimed in claim 8 wherein the plate is a hollow plate and said first and second photodetectors are arranged within the plate.

11. A system as claimed in claim 7 wherein a first photodetector is aligned with the axis of the optical collimator, and a second photodetector is aligned with a trajectory according to which a radiation at a central frequency in the second part of the collimated beam or in the beam outgoing from the second recombining means arrives on the plate.

12. A system according to claim 11, wherein said second part of the collimated beam or the beam outgoing from the second recombining means arrives on the plate perpendicular to the axis of the optical collimator system.

* * * * *